(No Model.) 4 Sheets—Sheet 1.
J. W. WALLIS.
COTTON PICKER.

No. 378,635. Patented Feb. 28, 1888.

WITNESSES:
INVENTOR:

(No Model.) 4 Sheets—Sheet 3.

J. W. WALLIS.
COTTON PICKER.

No. 378,635. Patented Feb. 28, 1888.

WITNESSES:
Donn Twitchell
C. Sedgwick

INVENTOR:
J. W. Wallis
BY
ATTORNEYS.

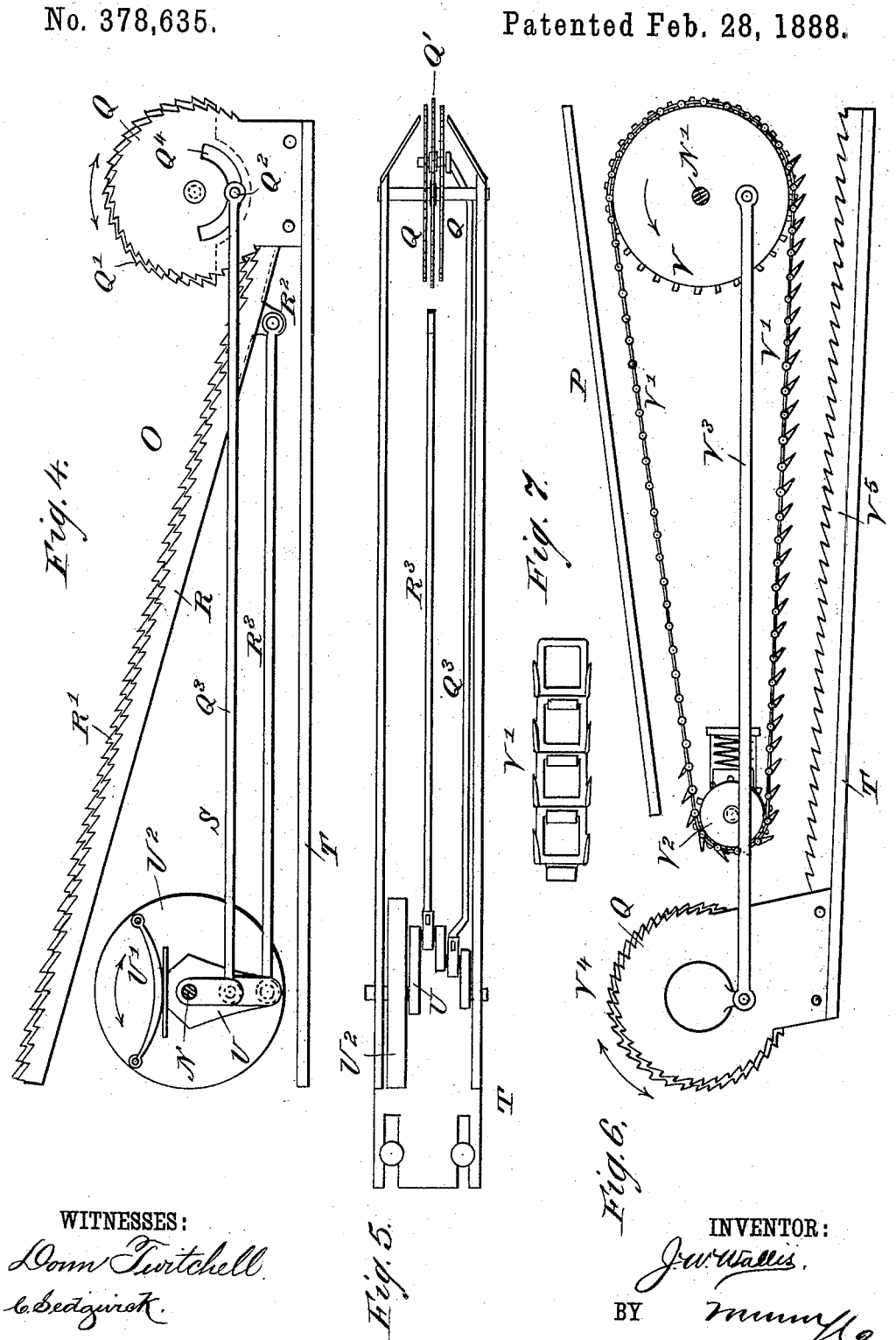

UNITED STATES PATENT OFFICE.

JAMES W. WALLIS, OF MEMPHIS, ALABAMA.

COTTON-PICKER.

SPECIFICATION forming part of Letters Patent No. 378,635, dated February 28, 1888.

Application filed May 21, 1886. Serial No. 202,869. (No model.)

*To all whom it may concern:*

Be it known that I, JAMES W. WALLIS, of Memphis, in the county of Pickens and the State of Alabama, have invented a new and Improved Cotton-Picker, of which the following is a full, clear, and exact description.

The object of my invention is to provide a new and improved cotton-picker which effectually and automatically picks the cotton from the plants in the field or from the burrs of gathered cotton.

The invention consists of various parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
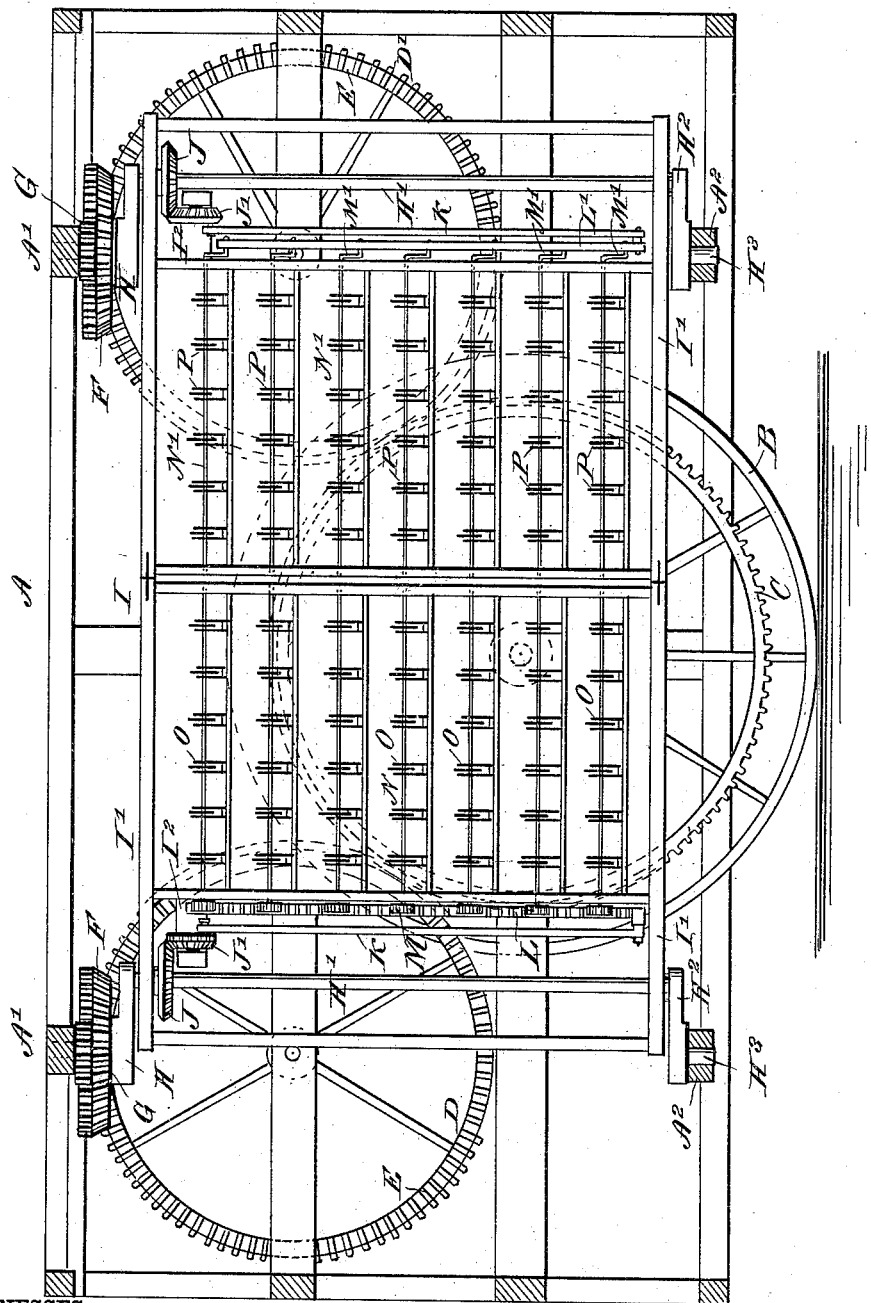
Figure 2:
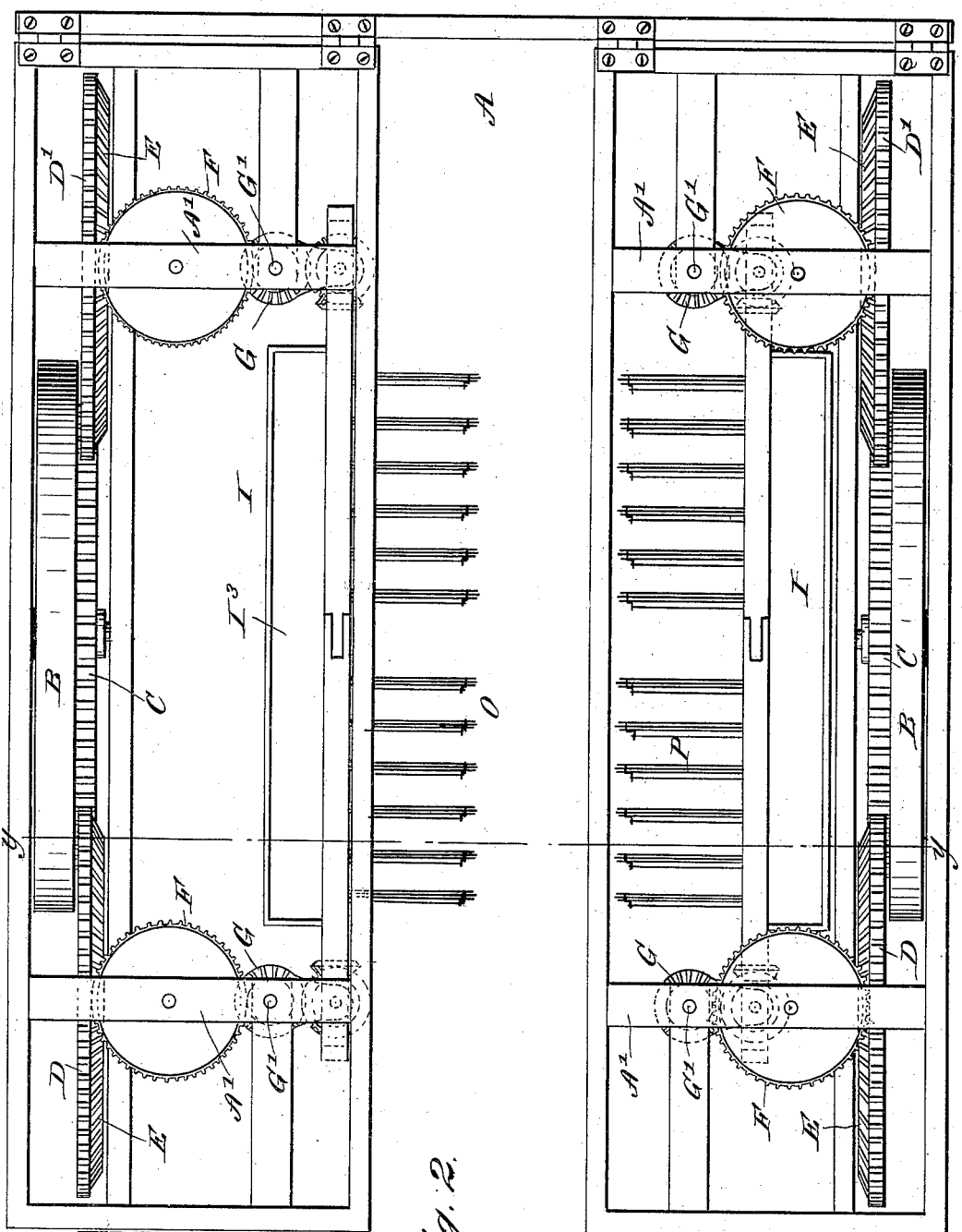
Figure 3:
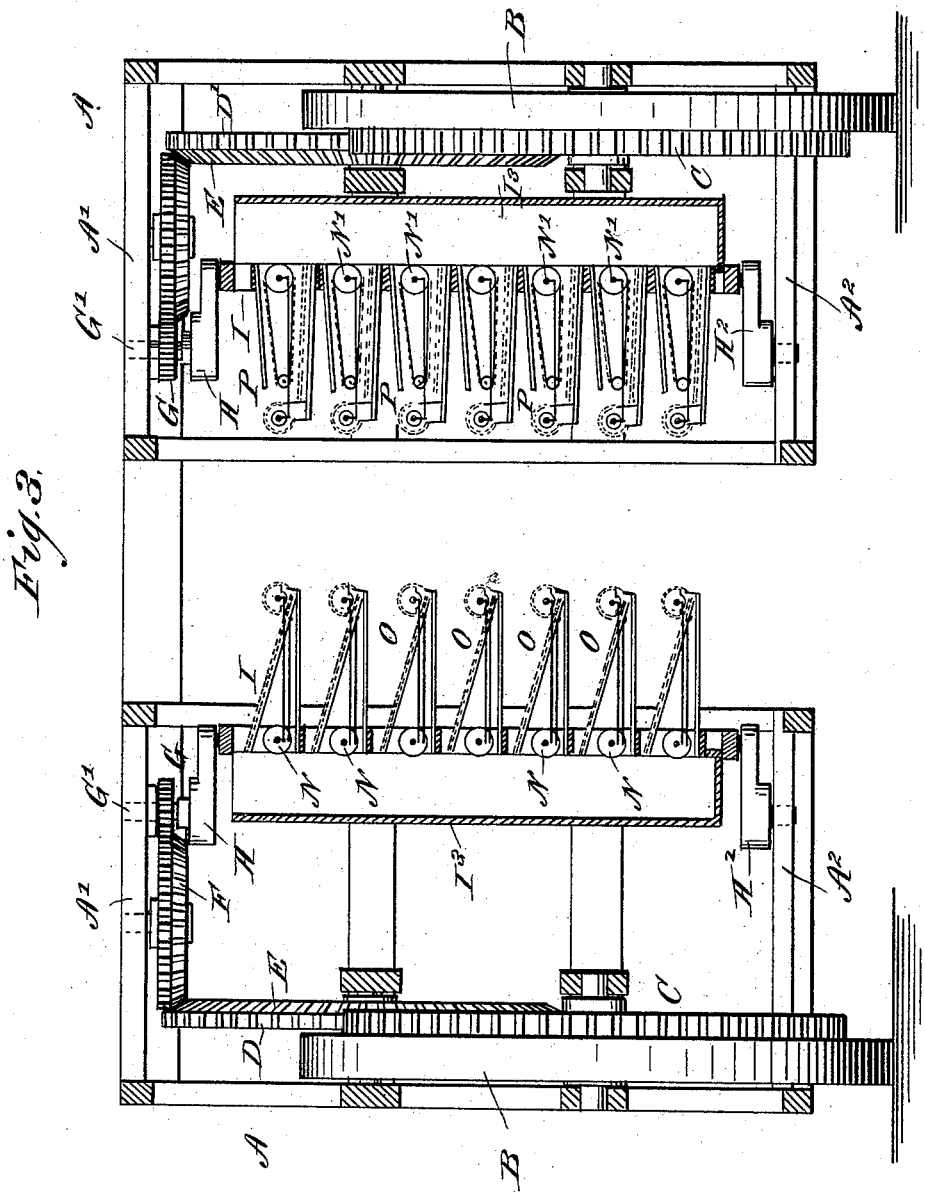

Figure 1 is a sectional side elevation of my improvement. Fig. 2 is a plan view of the same. Fig. 3 is a vertical cross-section of the same on the line $y\,y$, Fig. 2. Fig. 4 is a side elevation of the picking device. Fig. 5 is a plan view of the same. Fig. 6 is a modified form of the picking device. Fig. 7 is a plan view of part of the chain belt.

A double frame, A, of suitable construction, is mounted on the driving-wheels B, each of which operates, independently of the other, a swinging picking-frame supported by the double frame A. As the picking-frames are alike on both sides of the machine, it will suffice to describe but one of them.

The driving-wheel B is provided with a cog-wheel, C, which meshes into the cog-wheels D and D', mounted on the frame A, one on each side of the wheel C, and each having a bevel gear-wheel, E, which meshes into a bevel gear-wheel, F, mounted on the top cross-beam A' of the main frame A. A pinion, G, meshes into the gear-wheel F, and is attached to a shaft, G', having its bearing on the cross-beam A', and being provided with a crank-arm, H, on the outer end of which is secured the vertical shaft H', which passes through one end of each of the horizontal bars I' of the picking-frame I, and is attached on its lower end to the crank-arm $H^2$, secured to a stud, $H^3$, having its bearing in the cross-beam $A^2$ of the main frame, A.

Each of the shafts H' is provided near its upper end with a bevel gear-wheel, J, which meshes into the bevel gear-wheel J', mounted on a stud attached to one arm, $I^2$, of the picking-frame I, and having a crank-pin on which is fulcrumed the upper end of the pitman K, which has its lower end pivoted either to a rack, L, as shown at the left of Fig. 1, or to a bar, L', as shown at the right of the same figure. The rack L is in gear with a number of cog-wheels M, each mounted on a horizontal shaft, N, having its bearing on the picking-frame I, and each operating a set of picking devices. To the bar L' are attached crank-arms M', secured to the horizontal shafts N', which serve a similar purpose to that of the shafts N.

Each set of picking devices may be either oscillating or rotary. The oscillating devices O, illustrated in detail in Figs. 4 and 5, are operated by the rack and pinions L and M above referred to, while the rotary picking devices P are operated by the bar L' and the crank-arms M'.

Each picking device O consists of two stationary circular saws, Q Q, between which oscillates a circular saw, Q', which is a trifle larger in diameter than the stationary circular saws; of two inclined stationary straight saws, R R, between which slides an inclined straight saw, R', having its teeth projecting a short distance above the teeth of the saws R, and of a device, S, for imparting their respective motions to the sliding and oscillating saws R' and Q' from the shaft N. The bar T, attached to the picking-frame I, carries on its outer end the circular stationary saws Q, between which is mounted to oscillate the saw Q', having on its face a stud, $Q^2$, which projects through a slot, $Q^4$, formed in the face of one of the stationary saws Q, the said stud $Q^2$ being connected by a bar, $Q^3$, with the crank-arm U, attached to the shaft N.

The stationary saws R R are rigidly secured at one end to the stationary circular saws Q, being supported at the other end, in any suitable manner, by the picking-frame I. The sliding saw R', placed between the stationary saws R and having suitable bearings on the picking-frame I, is provided near its lower end with a stud, $R^2$, which connects, by means of the bar R³, with the crank-arm U. The latter rests with one end against the spring U', secured on the disk U², and the end of the crank-arm U is beveled, so that when any obstruction interferes with the motion of the saws R' and Q' the spring U' will permit the crank-arm U to remain stationary.

In the arrangement shown in Fig. 6, the shaft N' is provided with the sprocket-pulley V, over which passes an endless saw-belt, V', which also passes over a small sprocket-pulley, V², placed near the stationary circular saws Q, supported by the bar T from the picking-frame I. The pulley V is connected by a pitman, V³, with the circular oscillating saw V⁴, placed between two stationary saws, Q. A straight saw, V⁵, is attached to the supporting-bar T, running parallel with the lower part of the saw-belt V'.

The picking-frame I is provided on its inner side with a box, I³, into which the cotton passes from the picking devices, and which is provided with a suitable mechanism for removing the cotton from the said box I³ as fast as it is delivered by the picking devices.

The operation of my machine is as follows: It will be seen that when one of the main driving-wheels is revolved it imparts a swinging motion to the crank-arms by means of the gear-wheels C, D, E, F, and G, the crank-arms H impart a swinging motion to the picking-frame I, and at the same time the gear-wheel J, meshing into the gear-wheel J', imparts either an oscillating motion to the shafts N or a rotary motion to the shafts N'. The oscillating motion of the shaft N imparts an oscillation to the circular saw Q, by means of the crank-arm U and the bar Q³, and a sliding motion to the inclined straight saw R', by means of the crank-arm U and the bar R³. The shaft N' imparts a rotary motion to the pulley V, and thereby sets the endless saw-belt V' in motion and at the same time oscillates the circular saw V⁴.

It will be seen that the picking-frames I on each side of the machine are so arranged that when one is thrown to its innermost position the other is in its outermost position, so that the picking devices O and P of one of the picking-frames I enter the cotton-bushes, while the picking devices of the other frame I recede from the same. The oscillating rotary motion of the circular saws Q' and V⁴ and the sliding motion of the straight saw R' and the movement of the endless saw-belt V' pull the cotton from the bushes and work the same, with the aid of the stationary straight saw R or V⁵, into the box I³ of the picking-frame, from which it is removed in any suitable manner by any convenient device.

As shown in Fig. 1, each picking-frame may have oscillating and revolving picking devices, or the frame may be provided with only one kind of device.

The gearing for imparting the swinging motion to the crank-arms H may be varied.

Having thus fully described my invention, I claim as new and desire to secure by Letters Patent—

1. In a cotton-picker, the main frame and driving-wheels, in combination with the picking-frames carried by shafts connected to crank-arms geared to the driving-wheels, said picking-frames carrying shafts provided with pickers geared to racks carried by crank-arms and a pitman, one of said latter crank-arms being geared to one of the main frame-carrying shafts, substantially as and for the purpose set forth.

2. In a cotton-picker, the crank-arms H and the shafts H', in combination with the picking-frames I and the picking devices O, the same comprising stationary circular saws, between which oscillates a circular saw, inclined stationary straight saws, between which slides an inclined straight saw, and means for imparting the respective motions to the sliding and oscillating saws, substantially as shown and described.

3. In a cotton-picker, the crank-arms H, the shafts H', and the gear-wheels J, in combination with the picking-frame I, the gear-wheels J', the pitman K, the racks L, the pinions M, meshing into the said racks L, the shafts N, and the picking devices O, substantially as shown and described.

4. In a cotton-picker, the shaft N, the crank-arm U, and the bars Q³ and R³, in combination with the oscillating circular saw Q', the sliding inclined straight saw R', the stationary circular saws Q, and the stationary inclined straight saws R, substantially as shown and described.

5. In a cotton-picker, the stationary circular saws Q and the stationary inclined straight saws R, in combination with the circular oscillating saw Q' and the sliding inclined saw R', substantially as shown and described.

JAMES W. WALLIS.

Witnesses:
JACOB M. ARCHER,
CHARLES W. SPANN.